(12) United States Patent
Lee et al.

(10) Patent No.: US 9,755,256 B2
(45) Date of Patent: Sep. 5, 2017

(54) FUEL CELL SYSTEM AND DRIVING CONTROL METHOD THEREOF

(71) Applicant: Hyundai Motor Company, Seoul (KR)

(72) Inventors: Dong Hun Lee, Anyang-si (KR); Sang Uk Kwon, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 193 days.

(21) Appl. No.: 14/507,522

(22) Filed: Oct. 6, 2014

(65) Prior Publication Data

US 2015/0171446 A1 Jun. 18, 2015

(30) Foreign Application Priority Data

Dec. 17, 2013 (KR) .................. 10-2013-0156966

(51) Int. Cl.
*H02P 1/00* (2006.01)
*H01M 8/04746* (2016.01)
(Continued)

(52) U.S. Cl.
CPC .......... *H01M 8/04753* (2013.01); *B60L 1/00* (2013.01); *B60L 7/14* (2013.01); *B60L 11/1862* (2013.01); *B60L 11/1868* (2013.01); *B60L 11/1883* (2013.01); *B60L 11/1887* (2013.01); *B60L 11/1892* (2013.01); *H01M 8/04097* (2013.01); *H01M 8/04228* (2016.02); *H01M 8/04291* (2013.01); *H01M 8/04492* (2013.01); *H02P 4/00* (2013.01); *B60L 2240/547* (2013.01); *B60L 2240/549* (2013.01); *H01M 2250/20* (2013.01); *H02J 1/00* (2013.01); *H02J 7/34* (2013.01); *H02J 2001/004* (2013.01); *Y02T 10/7044* (2013.01); *Y02T 10/7066* (2013.01); *Y02T 90/32* (2013.01); *Y02T 90/34* (2013.01)

(58) Field of Classification Search
CPC .. B60W 10/08; B60W 10/06; H01M 2250/20; H01M 8/04753; Y02E 60/50
See application file for complete search history.

(56) References Cited

U.S. PATENT DOCUMENTS

2014/0072887 A1* 3/2014 O'Leary .......... H01M 8/04238
429/410

FOREIGN PATENT DOCUMENTS

JP 2004-172027 A 6/2004
JP 2008-034254 A 2/2008
(Continued)

OTHER PUBLICATIONS

Translation of JP2011019314 has been attached.*
(Continued)

*Primary Examiner* — Shawki S Ismail
*Assistant Examiner* — Zoheb Imtiaz
(74) *Attorney, Agent, or Firm* — McDermott Will & Emery LLP

(57) ABSTRACT

A method of controlling a fuel cell system includes decelerating the air blower that stops power generation of a fuel cell stack or supplies air to the fuel cell stack. A connection state of pipes connected to a valve is controlled by adjusting the valve disposed between an exit side of the air blower and an entrance side of a cathode of the fuel cell stack. According to the present disclosure, the time of maintaining open circuit voltage (OCV) can be reduced, and the dry out of the fuel cell stack can be prevented to improve durability of the fuel cell.

5 Claims, 5 Drawing Sheets

(51) Int. Cl.
  *H01M 8/04492* (2016.01)
  *H02P 4/00* (2006.01)
  *B60L 11/18* (2006.01)
  *B60L 1/00* (2006.01)
  *B60L 7/14* (2006.01)
  *H01M 8/04089* (2016.01)
  *H01M 8/04291* (2016.01)
  *H01M 8/04228* (2016.01)
  *H02J 1/00* (2006.01)
  *H02J 7/34* (2006.01)

(56) References Cited

FOREIGN PATENT DOCUMENTS

| | | |
|---|---|---|
| JP | 2011-019314 A | 1/2011 |
| KR | 2008-0048077 A | 5/2008 |
| KR | 2010-0125324 A | 11/2010 |
| KR | 10-2012-0009631 A | 2/2012 |
| KR | 10-2012-0012610 A | 2/2012 |
| KR | 10-2012-0064204 A | 6/2012 |

OTHER PUBLICATIONS

Translation or KR1020120012610 has been attached.*
Korean Office Action issued in Korean Application No. 10-2013-0156966 dated Mar. 20, 2015.

* cited by examiner

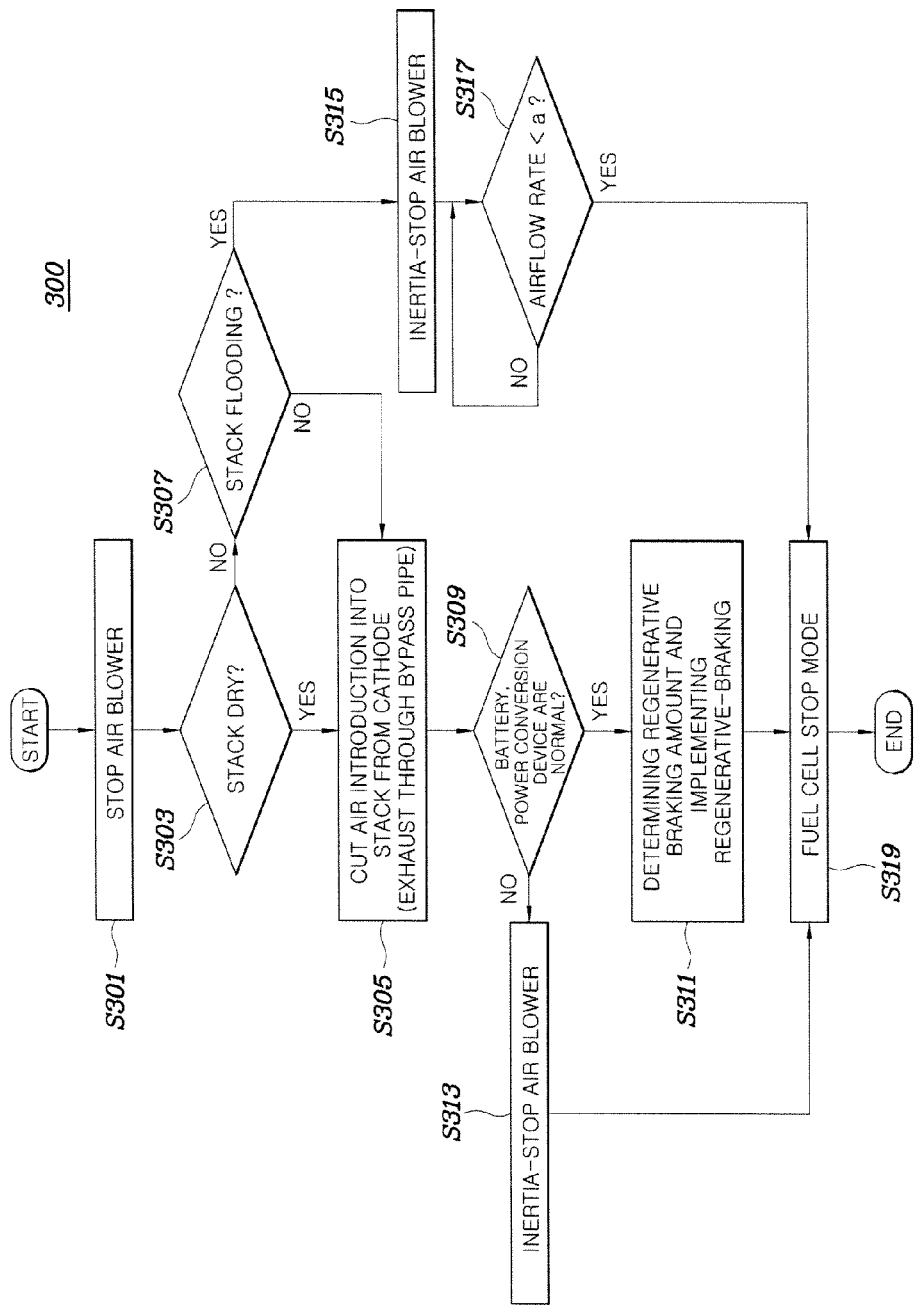

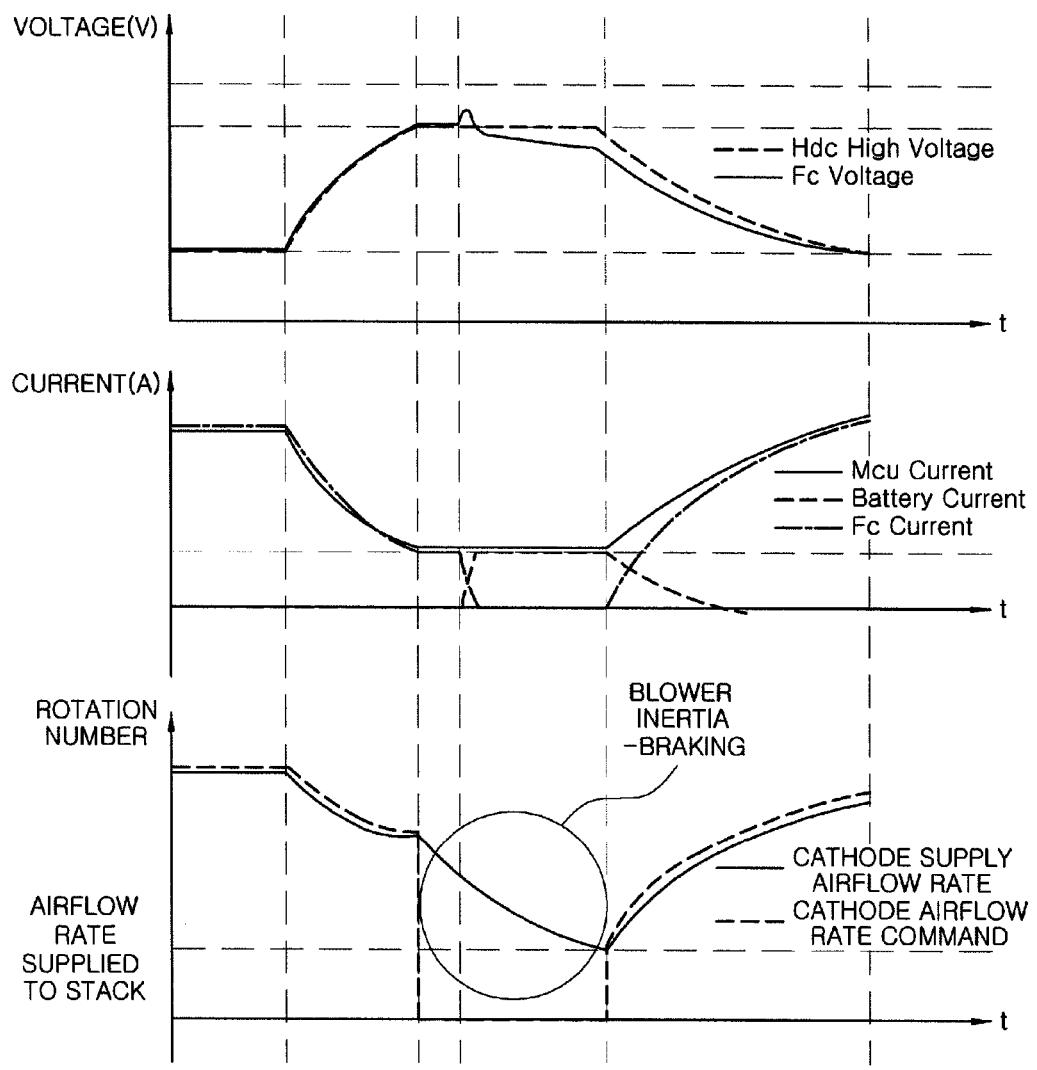

FUEL CELL SYSTEM AND DRIVING CONTROL METHOD THEREOF

CROSS-REFERENCE TO RELATED APPLICATION

The present application claims the benefit of priority to Korean Patent Application No. 10-2013-0156966, filed on Dec. 17, 2013, the entire contents of which is incorporated herein for all purposes by this reference.

BACKGROUND (a) Technical Field

The present disclosure relates to a fuel cell system and a driving control method thereof, and more particularly, to a fuel cell system and a driving control method thereof capable of improving drivability of a vehicle and durability of a fuel cell.

(b) Background Art

Generally, a fuel cell vehicle includes a fuel cell stack in which a plurality of fuel cells used as a power source is stacked. A fuel supply system supplies hydrogen and the like as fuel to the fuel cell stack. An air supply system supplies oxygen necessary for an electro-chemical reaction as an oxidizing agent. Water and heat management system controls a temperature of the fuel cell stack.

The fuel supply system depressurizes compressed hydrogen in a hydrogen tank and supplies it to an anode of the fuel cell stack. An air supply system supplies inhaled external air to a cathode of the fuel cell stack by operating an air blower.

When hydrogen is supplied to the anode of the fuel cell stack, and oxygen is supplied to the cathode thereof, hydrogen ions are separated through a catalytic reaction in the anode, and the separated hydrogen ions are transferred to the cathode as an oxidation electrode through an electrolytic film. Here, the hydrogen ions separated from the anode, electrodes, and oxygen electro-chemically react together in the oxidation electrode to produce electricity. In more detail, hydrogen is electro-chemically oxidized in the anode, and oxygen is electro-chemically reduced in the cathode. Electricity and heat are generated through movement of electrons produced at that time, and water vapor or water is generated through a chemical reaction where hydrogen and oxygen are combined.

An exhausting device is provided for discharging by-products, such as, water vapor, water, and heat, which are produced as the electricity is generated through the fuel cell stack and not-reacted on hydrogen, oxygen, etc. The gases, such as, water vapor, hydrogen, oxygen, and the like are exhausted to the outside through a discharging passage.

Configurations of the air blower, a hydrogen reflow blower, a water pump, and the like for driving a fuel cell are coupled to a main bus terminal to easily start the fuel cell. Various relays for blocking and connecting electrical power and a diode for preventing reverse-current to the fuel cell may be connected to the main bus terminal.

Dry air supplied through the air blower is humidified through a humidifier and then supplied to the cathode of the fuel cell stack. The discharging gas from the cathode is transferred to the humidifier while it is humidified through water produced inside the fuel cell stack, and may be used when humidifying the dry air to be supplied to the cathode by the air blower.

Fuel cell stop or fuel cell restart, where power generation of the fuel cell stops and restarts when necessary to improve fuel efficiency is an idle stop and on/off control where the power generation of the fuel cell temporally stops in the fuel cell vehicle, is considered to be important.

Specifically, when stopping and restarting the power generation of the fuel cell while the vehicle is running, stopping and restarting of the fuel cell need to be controlled, considering the occurrence of dry out in the fuel cell stack, re-acceleration, fuel efficiency, etc.

The description provided above as related art of the present disclosure is just for helping in understanding the background of the present disclosure and should not be construed as being included in the related art known by those skilled in the art.

SUMMARY

The present disclosure proposes to solve the aforementioned problems associated with the prior art. An aspect of the present disclosure provides a method for controlling driving of a fuel cell system that controls stop of fuel cell power generation and driving when stopping the fuel cell power generation.

A method for controlling a fuel cell system according to an exemplary embodiment of the present disclosure may comprise stopping power generation of a fuel cell stack or decelerating an air blower that supplies air to the fuel cell stack. A connection state of pipes connected to a valve is controlled by adjusting the valve disposed between an exit side of the air blower and an entrance side of a cathode of the fuel cell stack.

A dry state of the fuel cell stack may be determined prior to the step of controlling the connection state.

The connection state of the pipes may be controlled in accordance with a determination result.

The step of controlling the connection state may comprise a step of discharging the air supplied through a bypass pipe among the pipes connected to the valve to an exit side of the cathode when the fuel cell stack is in the dry state based on a determination result.

The step of controlling the connection state may comprise a step of exhausting the air supplied through a bypass pipe among the pipes connected to the valve to the outside when the fuel cell stack is in a dry state based on a determination result.

The air blower is stopped in different ways depending on a normal or abnormal operation of a battery and a charging state thereof, and a normal or abnormal operation of a DC/DC converter that connects the battery with the fuel cell stack after the supplied air is exhausted.

The air blower may be regenerative-stopped when the battery and the DC/DC converter are operated normally and the charging state of the battery is less than a reference charging state.

The air blower may be inertia-stopped when the battery does not operate, the charging state of the battery is higher than a reference charging state, or the DC/DC converter that connects the battery with the fuel cell stack is broken down.

The step of controlling the connection state may comprise a step of inertia-braking the air blower when the fuel cell stack is determined to be in a flooding state based on a determination result.

The fuel cell system may be stopped when an airflow rate supplied to the cathode in accordance with the inertia-braking of the air blower satisfies a reference value.

A method for controlling the driving of a fuel cell system according to another embodiment of the present disclosure may comprise stopping the power generation of a fuel cell stack or decelerating the air blower that supplies air to the fuel cell stack. The airflow rate supplied to the fuel cell stack and an airflow rate supplied through the air blower are independently controlled by adjusting a valve disposed between an exit side of the air blower and an entrance side of cathode of the fuel cell stack.

A fuel cell system according to an embodiment of the present disclosure may comprise a fuel cell stack including a cathode and an anode. An air blower supplies air to the cathode. A valve is disposed between an exit side of an air blower and an entrance side of the cathode. A plurality of pipes are connected to the valve. A controller controls a connection state of the pipes by adjusting the valve.

The controller may determine the dry state of the fuel cell stack, and control the connection state of the pipes by adjusting the valve based on a determination result.

The valve may be a 3-way valve which may be connected to the exit side of the air blower, another part of a bypass pipe, one part of which is connected to an exit side of the cathode, and the entrance side of the cathode.

The controller may adjust the valve to exhaust the air supplied through a bypass pipe among the pipes connected to the valve to an exit side of the cathode when the fuel cell stack is determined to be in a dry state.

BRIEF DESCRIPTION OF THE DRAWINGS

The above and other features of the present disclosure will now be described in detail with reference to exemplary embodiments thereof illustrated by the accompanying drawings which are given herein below by way of illustration only, and thus are not limitative of the present disclosure.

FIG. 3 is a flow chart briefly illustrating a driving control method of a fuel cell system according to an embodiment of the present disclosure.

FIGS. 4A and 4B are graphs schematically illustrating voltage, current, and the rotation number of an air blower per time when the air blower is driven by inertia braking and air supply to a cathode is blocked using a valve in a driving control method according to an embodiment of the present disclosure.

Figure 1:
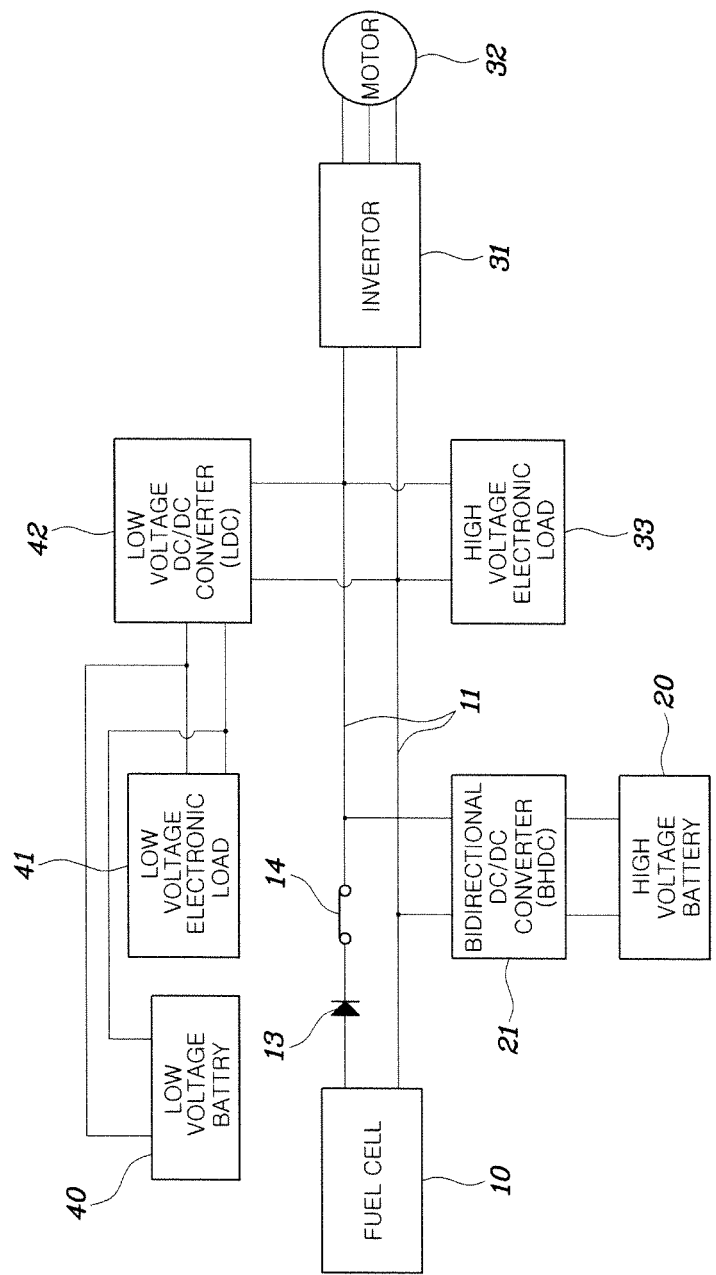
FIG. 1 is a block diagram illustrating a power net for a fuel cell system according to an embodiment of the present disclosure.

It should be understood that the accompanying drawings are not necessarily to scale, presenting a somewhat simplified representation of various exemplary features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The embodiments according to a concept of the present invention may be changed variously and have various types, and thus, special embodiments will be illustrated in the drawings and described in the specification. However, the embodiments according to a concept of the present invention are not limited to the specifically disclosed types and thus it should be understood that it includes all modifications and equivalents or replacements included within a spirit and a scope of the present disclosure.

Although terms like a first and a second are used to describe various components, but the components are not limited to these terms. These terms are used only to differentiate one component from another one, for example, the first component can be referred to as the second component, or the second component can be referred to as the first component, without departing from the scope of the present disclosure.

It also should be understood that when it is stated that one component is "connected" or "coupled to another component", even though the one component may be directly connected or coupled to another component, but there may be other components between them. However, it has to be understood that when it is stated that one component is "directly connected" or "directly coupled" to another component, there is no intermediate component between them. The terms used for describing a relation among other components, that is, "between" and "right between" or "adjacent to" and "directly adjacent to" have to be construed similarly.

The terminology used herein is for the purpose of describing particular embodiments only and is not intended to be limiting to the embodiments. As used herein, unless otherwise defined, the singular forms "a," "an," and "the" are intended to include the plural forms as well. Unless the context indicates otherwise, it will be further understood that the terms "comprises" and/or "having" when used in this specification, specify the presence of stated features, integers, steps, operations, elements, and/or components, but do not preclude the presence or addition of one or more other features, integers, steps, operations, elements, components, parts, or combination thereof.

All terms including technical or scientific terminology used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, reference numerals will be made in detail to various embodiments of the present disclosure, examples of which are illustrated in the accompanying drawings and described below. In the drawings, the same reference numerals refer to the same components.

FIG. 1 is a block diagram illustrating a power net of a fuel cell system according to an embodiment of the present disclosure.

Referring to FIG. 1, a fuel cell system according to an embodiment of the present disclosure includes a fuel cell 10 as a main power source and a high voltage battery 20 (a main battery) as a supplementary power source, which are connected in parallel through a main bus terminal 11. A bidirectional high voltage DC/DC converter (BHDC) 21 is connected to the high voltage battery 20 which controls an output of the high voltage battery 20. An inverter 31 is connected to the main bus terminal 11 as an output of the fuel cell 10 and the high voltage battery 20. A driving motor 32 is connected to the inverter 31. A high voltage electrical load 33 inside a vehicle excludes the inverter 31 and the driving motor 32. A low voltage battery (supplementary battery) 40, a low voltage electrical load 41, and a low voltage DC/DC converter (LDC) 42 are connected. The LDC 42 is connected to the main bus terminal 11 to convert high voltage into low voltage.

The fuel cell 10 as the main power source for the vehicle and the high voltage battery 20 used as the supplementary power source are connected in parallel with a respective load within the system such as the inverter 31 or the driving motor 32 through the main bus terminal 11. The BHDC 21 connected to the high voltage battery 20 is connected to the main bus terminal 11 as the output of the fuel cell 10, and thus, the outputs of the fuel cell 10 and the high voltage battery 20 can be controlled by controlling a voltage of the BHDC 21 (output voltage to the main bus terminal).

A diode 13 is connected to prevent a reverse current, and a relay 14 is provided for selectively connecting the fuel cell 10 to the main bus terminal 11 on a fuel cell terminal. A relay 14 is maintained in a connection state not only when the fuel cell 10 is driven normally but also when the fuel cell system is idle stopped or restarted. The connection of the relay 14 is released only when the vehicle is off (normal shut down due to key-off) or abnormally shut down.

Additionally, the inverter 31 for rotating the driving motor 32 is connected to the outputs of the fuel cell 10 and the high voltage battery 20 through the main bus terminal 11 to drive the driving motor 32 by phase-converting power supplied from the fuel cell 10 and/or the high voltage battery 20.

The driving motor 32 is driven either on a fuel cell mode where only the output (current) of the fuel cell 10 is used, driven on an electric vehicle (EV) mode where only the output of the high voltage battery 20 is used, or driven on a hybrid mode where the output of the fuel cell 10 is supplemented with the output of the high voltage battery 20.

Specifically, when a predetermined condition for the idle stop is satisfied in the fuel cell system, an idle stop control is performed to stop the power generation of the fuel cell 10 by stopping the air supply. The vehicle drives under the EV mode in which the output of the high voltage battery 20 is used only until the fuel cell 10 restarts, and the driving motor 32 is driven with the output of the fuel cell 10.

While the vehicle drives under the EV mode, the voltage of the high voltage battery 20 is boosted through a boost control of the BHDC 21 connected to a terminal of the high voltage battery 20 in a state that the relay 14 is ON, and the power generation of the fuel cell 10 is stopped (air supply is stopped), and the loads within the vehicle such as the inverter 31 or the driving motor 32 are driven only with the output of the high voltage battery 20.

Additionally, if a predetermined restarting condition is satisfied after stopping the air supply when the fuel cell system is idle-stopped, the fuel cell restarts by supplying the air. When the fuel cell system returns to a normal driving mode after restarting, the output of the fuel cell 10 is following-controlled in accordance with the vehicle load (load following control) while air is supplied normally, and the boosting state of the BHDC 21 is released.

Figure 2:
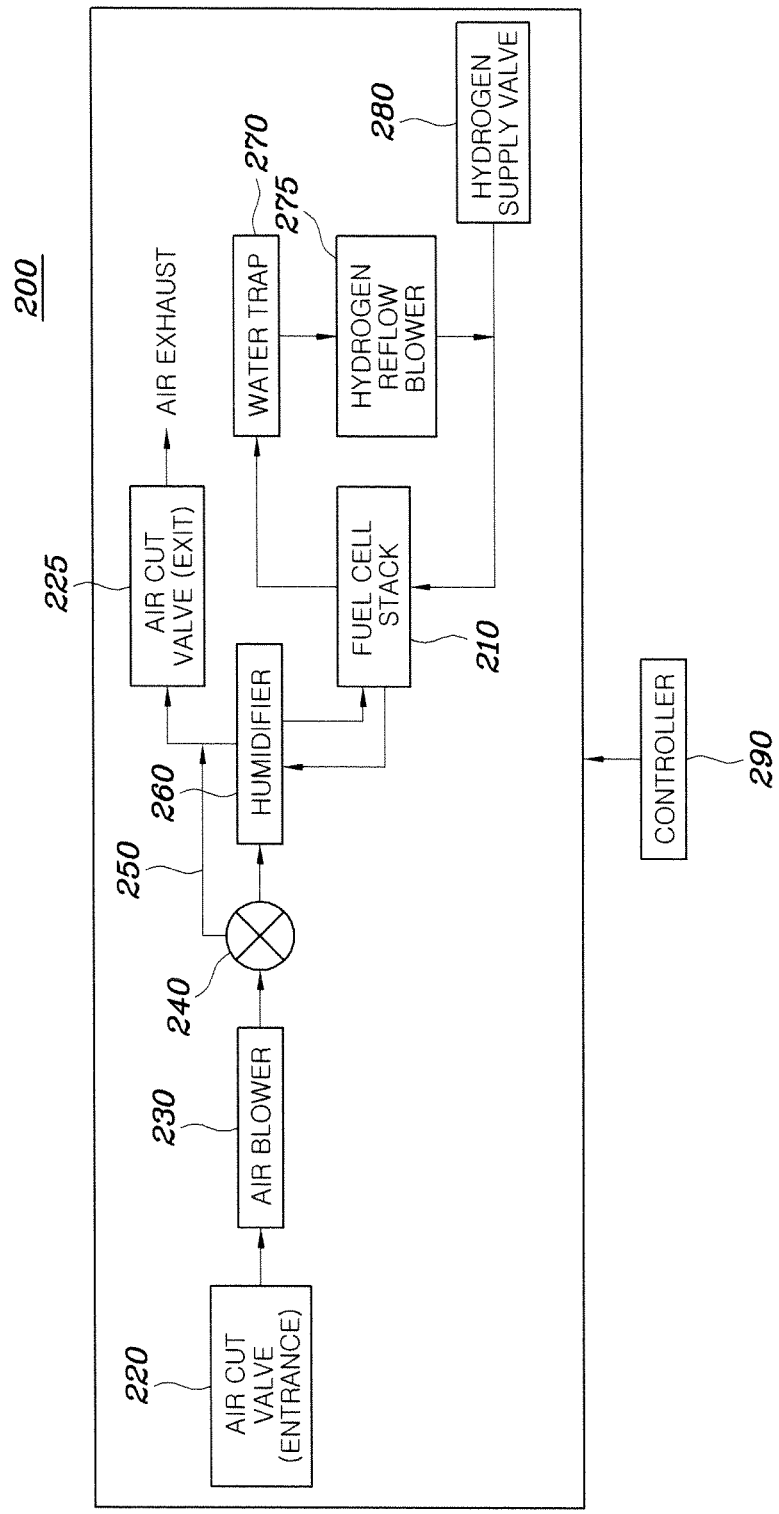
FIG. 2 is a block diagram illustrating a configuration of a fuel cell system according to an embodiment of the present disclosure.

FIG. 2 is a block diagram illustrating a configuration of a fuel cell system according to an embodiment of the present disclosure.

Referring to FIG. 2, a fuel cell system 200 according to an embodiment of the present disclosure may include: a fuel cell stack 210; an air cut valve 220 at an entrance side; an air cut valve 225 at an exit side; an air blower 230; a 3-way valve 240; a bypass pipe 250; a humidifier 260; a water trap 270; a hydrogen re-flower 275; a hydrogen supply valve 280; and a controller 290. Further, a filter (not shown) may be included on a front end of the air cut valve 220 at an entrance side, and a muffler (not shown) may be included between the air cut valve 220 and the air blower 230. A purge valve and a drain valve (not shown) may be further included at the exit side of an anode.

Here, some of the components for the fuel cell system 200 are generally known to a skilled person in the art, and thus, the descriptions thereof are omitted.

The fuel cell stack 210 includes a cathode and the anode, and the air blower 230 supplies air to the cathode. The valve 240 is a 3-way valve, one part of which is connected to an exit of the air blower 230, another part of which is connected to the other side of the bypass pipe 250 having one side connected to an exit of the humidifier 260, and the last part of which is connected to the humidifier 260. The bypass pipe 250 may be formed between the exit of the humidifier 260 and the valve 240 and further disposed between the air cut valve 225 and the valve 240. The air introduced through the bypass pipe 250 may move toward the air cut valve 225 through one of cathode pipes at a rear end of the fuel cell stack 210 and may not pass through cathode channels within the fuel cell stack 210. The bypass pipe 250 may be directly connected to external air. Therefore, the air introduced through the bypass pipe 250 may be exhausted to the atmospheric air. Additionally, the bypass pipe 250, if necessary, may be connected to an exit side of the cathode, that is, not to the exit of the humidifier 260, but to the air cut valve 225 at the exit side. Here, the air introduced through the bypass pipe 250 may be exhausted to the external air through controlling an opening degree of the air cut valve 225.

The control of the air supply pass using the valve 224 is performed while a fuel cell vehicle is stopped. The amount of air to be supplied to the fuel cell stack 210 and the amount of air to be supplied to the bypass pipe 250 through controlling the opening degree of the valve 224 can be controlled independently.

The controller 290 may determine whether the fuel cell stack 210 is dried out, that is, in a drying state or a flooding state, by using a relative humidity (RH) estimator of the air at an exit of the fuel cell stack 210 or by monitoring a current-voltage (IV) curve in real time.

The controller 290 may determine the drying state of the fuel cell stack 210 and adjusts the valve 240 in accordance with a determined result to control connection states of pipes, which are a pipe connecting the valve 240 to the cathode and a pipe connecting the air blower 230 and the valve 240, and to control a connection state of the bypass valve 250 which connects the exit of the humidifier 260 to the valve 240.

In more detail, the controller 290 may control the valve 240 when it is determined that the fuel cell stack 210 is in the drying state, such that the air supplied from the air blower 230 through the bypass pipe 250 connected to the exit of the humidifier 260 among the pipes connected to the valve 240 is exhausted outside.

Further, when the bypass pipe 250 is connected directly to the atmospheric air, not to the exit side of the cathode, the controller 290 may control the valve 240, such that the air supplied from the air blower 230 is exhausted outside. That is, the controller 290 blocks the air supply to the cathode except for the flooding state of the fuel cell stack 210 to minimize the air supply when the air blower 230 accelerates, thereby preventing the fuel cell stack 210 from being dried.

In order to block the air supply to the cathode, the controller 290 may block the air to be supplied to the cathode through the 3-way valve 240 arranged on the pipe connected to an entrance of the cathode while the power generation of a fuel cell is stopped thereby to minimize generation stop time of the cathode. In a case of the fuel cell system 200 according to an embodiment of the present disclosure, the 3-way valve 240 and the bypass pipe 250 connected thereto are provided separately, and thus, the controller 290 may control an airflow rate to be supplied to the cathode and the air supplied through the air blower 230 independently. Accordingly, the regenerative braking amount of the air blower 230 may be controlled variably to improve fuel efficiency by maximizing a recovery rate of energy. Further, a driving responsiveness can be improved at a frequent accelerated/decelerated section.

The controller 290 may control an airflow rate to be supplied to the fuel cell stack 210 and the air supplied through the air blower 230 independently by adjusting the valve 240.

Additionally, not only in the power generation stop state of the fuel cell but also at a deceleration section of the air blower 230, the air blower 230 may stop with a regenerative braking by controlling an airflow rate to be supplied to the cathode to recover energy. In a conventional configuration without the valve 240 in which the fuel cell stack 210 is in a drying state, the regenerative braking is impossible even if the air blower 230 needs to be decelerated rapidly when the battery 20 and the DC/DC converter 21 are not in normal states. Thus, the air blower 230 stops through inertia braking, and unnecessary air is supplied, and as a result, the drying state of the fuel cell stack 210 is alleviated. However, according to the present disclosure, the airflow rate to be supplied to the cathode of the fuel cell stack 210 and the air supplied through the air blower 230 are controlled independently to solve the above drawbacks.

In addition, according to a conventional art, if the regenerative braking amount of the motor 32 and the regenerative braking amount of the air blower 230 when stopping with regenerative braking are not controlled organically, it is highly likely that fuel efficiency is lost. However, according to the present disclosure, it is possible to independently control the supply of the airflow rate to the air blower with the regenerative braking, thereby maximizing a recovery rate of the regenerative braking.

The regenerative braking amount of the air blower 230 may be set less than a value obtained by deducting the regenerative braking amount by the motor 32 from the maximum chargeable energy amount of the high voltage battery 20 and then adding the energy amount to be used by the electronic loads 33, 41.

The controller 290 may stop the air blower 230 in a different way after the air to be supplied is exhausted outside in accordance with a charging state of the high voltage battery 20, whether the high voltage battery 20 is operated normally, and whether the DC/DC converter 21 for connecting the high voltage battery 20 to the fuel cell stacks 10, 210 is operated normally.

The controller 290 may regenerative-stop the air blower 230 when the high voltage battery 20 and the DC/DC converter 21 are operated normally, and the charging state of the high voltage battery 20 is less than a reference value. That is, the controller 290 may regenerative-brake the air blower 230 to recover energy when the high voltage battery 20 and the DC/DC converter 21 are operated normally.

The controller 290 may inertia-stop the air blower 230 when the high voltage 20 is not operated, the charging state of the high voltage battery 20 is higher than the reference value, or the DC/DC converter 21 for connecting the high voltage battery 20 to the fuel cell stacks 10, 210 fails.

Additionally, the controller 290 may inertia-stop the air blower 230 when it is determined that the fuel cell stack 210 is in the flooding state by determining the drying state of the fuel cell stack 210. That is, the controller 290 may stop the air blower 230 when the fuel cell stack 210 is in the flooding state, wherein the controller 290 stops the air blower 230 with the inertia stop, not with the regenerative braking.

The controller 290 may stop a driving of the fuel cell system 200 when the airflow rate to be supplied to the cathode satisfies with a reference value in accordance with the inertia-stop of the air blower 230. That is, the controller 290 may allow the fuel cell system to enter a fuel cell stop mode when an airflow rate to be supplied to the cathode is less than the reference airflow rate for ending the process of the fuel cell power generation stop.

FIG. 3 is a flow chart illustrating a driving control method of a fuel cell system according to an embodiment of the present disclosure. Referring to FIGS. 2 and 3, according to a driving control method (300) of an embodiment of the present disclosure, the controller 290 determines whether the fuel cell stack 210 is in a drying state (S303) after stopping the air blower 230 (S301). The method for determining whether the fuel cell stack 210 is in the drying state may be performed by using an RH estimator for air at an exit of the fuel cell stack. It may also be determined by monitoring a current-voltage (IV) curve in real time.

In more detail, a controller (not shown) for a motor of an air blower, which is included conceptually in the controller 290, may control rotation of the air blower 230 to supply air to the fuel cell stack 210 and stop the rotation of the air blower 230 in a different way in accordance with whether or not the fuel cell stack 210 is in the drying state to stop the air supply to the fuel cell stack 210. When the fuel cell stack 210 is in the drying state, the controller 290 may stop the air input to the cathode of the fuel cell stack 210 and allow the air supplied from the air blower 230 through the bypass pipe 250 to be exhausted to the exit side or directly to the atmosphere by adjusting the opening degree of the valve 240 (S305).

The controller 290 may determine whether the high voltage battery 20 and the DC/DC converter 21 are in normal states (S309) and determine the regenerative braking amount of the air blower 230 when the high voltage battery 20 and the DC/DC converter 21 are operated normally, and stop the air blower 230 with a regenerative braking (S311). The controller may promptly block the air supply to the cathode through the valve 240. Accordingly, the fuel cell stack 210 can be prevented from being further dried by dried external air. Further, energy may be recovered through a regenerative braking driving of the air blower to improve the fuel efficiency.

When the high voltage battery 20 and the DC/DC converter 21 are not in normal states, the controller 290 may inertia-stop the air blower 230 (S313). However, even in this case, the air supply to the cathode is cut promptly in the valve 240, and the air supplied from the air blower 230 is exhausted to at least one pipe among the pipes of the cathode at a rear end of the fuel cell stack 210 or outside through the bypass pipe 250 without passing through channels of the cathode inside the fuel cell stack 210, thereby preventing the drying state of the fuel cell stack 210.

The controller 290 may determine again whether the fuel cell stack 210 is in a flooding state (S307) when the fuel cell stack 210 is not in the drying state. When the fuel cell stack 210 is in the flooding state, the controller 290 may drive the air blower 230 with inertia braking and stop the air blower 230 by inertia braking (S315). That is, the controller may control the air blower 230 to be stopped with only inertia without driving by regenerative braking. When driving with inertia braking, an acceleration performance can be ensured by using the inertia rotation number when a cell is accelerated. That is, when driving with inertia braking, the air blower 230 may gradually stop, and thus, the rotation number of the air blower 230 can rapidly increase from the rotation number of the air blower 230 when a reoperation of a fuel cell is required.

When the fuel cell stack 210 is not in the flooding state based on the determination on whether the fuel cell stack 210 is in the flooding state, the controller 290 may control the opening degree of the valve 240. In a case where the fuel cell stack 210 is in the drying state to exhaust the air supplied through the air blower 230 outside through the bypass pipe 250 connected to at least one pipe of the pipes of the cathode at the rear end of the fuel cell stack 210 (S305), or to the atmospheric air, not to the pipe at the exit side of the cathode. The following procedures are identical to when the fuel cell stack 230 is in the drying state.

Even when the fuel cell stack 210 is in the drying state, and thus, the air blower 230 is driven with regenerative braking, and the controller 290 may drive the air blower 230 with inertial braking if the high voltage battery 20 or the DC/DC converter 21 to recover regenerative braking power are not operated normally, or a state of charge (SOC) of the high voltage battery 20 is much higher than a reference SOC, and thus, the regenerative braking is limited.

When the airflow rate of the fuel cell stack 210 is less than a reference value due to the stop of the air blower 230, the controller 290 may stop the operation of the fuel cell system (S319). Here, the operation mode when the fuel cell is stopped may be referred to as a fuel cell stop mode.

Figure 4B:
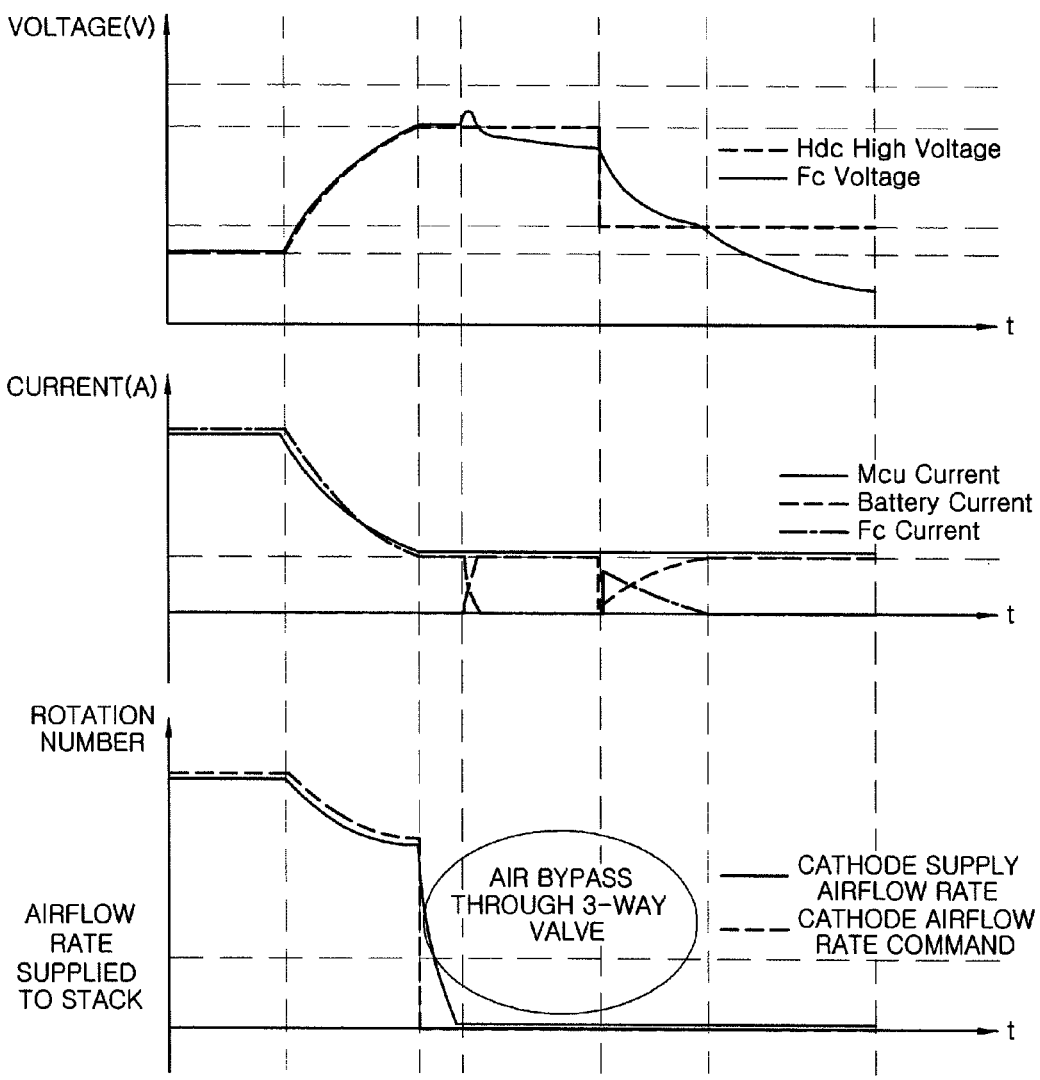

FIGS. 4A and 4B are graphs schematically illustrating variations of voltage, current, and rotation number of an air blower per time when the air blower is driven with inertia braking, and when air supplied through the air blower is bypassed according to an embodiment of the present disclosure. Referring to FIGS. 2, 4A, and 4B, it can be seen that the rotation number (Rpm) of the air blower is controlled in accordance with a rotation command from the controller 290 to the air blower 230. The rotation number of the air blower is slowly decreased even with a rotation stop command for the air blower when the air blower is driven with inertia braking. Then, the rotation number of the air blower is rapidly decreased corresponding to the rotation stop command for the air blower when the air supplied through the valve 24 is exhausted outside (FIG. 4B). As shown in FIG. 4A, when the air blower is driven with inertia braking, the drying air is introduced into the fuel cell stack thereby to alleviate a humidified state of the fuel cell stack. On the contrary, an acceleration performance can be ensured by using the rotation number of the air blower at the time when the air blower is reaccelerated in accordance with the gradual decrease of the rotation number of the air blower. Meanwhile, when the fuel cell stack is in a drying state, the air supplied from the air blower 230 is exhausted outside, thereby preventing the drying out of the fuel cell stack 210 due to air introduction.

According to the fuel cell system and the method of controlling the driving thereof of the present disclosure, the time for maintaining open circuit voltage (OCV) can be reduced, and the dry out of the fuel cell stack can be prevented to improve durability of the fuel cell.

Further, the reacceleration of the fuel cell vehicle can be improved when the vehicle is reaccelerated after power generation of the fuel cell is stopped.

Further, fuel efficiency loss can be minimized by recovering energy through a regenerative braking selection of an air blower.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A method for controlling a fuel cell system, the method comprising steps of:
    stopping power generation of a fuel cell stack or decelerating an air blower that supplies air to the fuel cell stack;
    determining a dry state of the fuel cell stack;
    controlling a connection state of pipes which are connected to a valve by adjusting the valve disposed between an exit side of the air blower and an entrance side of a cathode of the fuel cell stack in accordance with a determination result, wherein the step of controlling the connection state comprises a step of exhausting the air supplied through a bypass pipe among pipes connected to the valve to an exit side of the cathode when the fuel cell stack is in the dry state based on the determination result; and
    stopping the air blower, after the supplied air is exhausted, in different ways depending on conditions, in which the conditions include a normal or abnormal operation of a battery, a charging state of the battery, and a normal or abnormal operation of a DC/DC converter that connects the battery with the fuel cell stack,
    wherein the different ways include regenerative-stopping the air blower in a condition in which both of the battery and the DC/DC converter are operated normally and the charging state of the battery is less than a reference charging state.

2. The method of claim 1, wherein the step of controlling the connection state comprises a step of exhausting the air supplied through the bypass pipe to the outside when the fuel cell stack is in the dry state based on the determination result.

3. The method of claim 1, wherein the air blower is inertia-stopped when the battery does not operate, the charging state of the battery is higher than the reference charging state, or the DC/DC converter that connects the battery with the fuel cell stack is broken down.

4. The method of claim 1, wherein the step of controlling the connection state comprises a step of inertia-braking the air blower when the fuel cell stack is determined to be in a flooding state based on the determination result.

5. The method of claim 4, further comprising a step of:
    stopping the driving of the fuel cell system when an airflow rate supplied to the cathode in accordance with the inertia-braking of the air blower satisfies a reference value.

* * * * *